Oct. 4, 1966  F. W. BROWN III  3,277,331
SOLAR RADIATION SIMULATOR

Filed June 27, 1962  2 Sheets-Sheet 1

INVENTOR.
FRANK W. BROWN, III
BY
W. Glenn Jones
ATTORNEY

Oct. 4, 1966  F. W. BROWN III  3,277,331
SOLAR RADIATION SIMULATOR

Filed June 27, 1962  2 Sheets-Sheet 2

INVENTOR.
FRANK W. BROWN, III
BY W. Glenn Jones
ATTORNEY

United States Patent Office 3,277,331
Patented Oct. 4, 1966

3,277,331
SOLAR RADIATION SIMULATOR
Frank W. Brown III, 4313 Westmont St., Ventura, Calif.
Filed June 27, 1962, Ser. No. 205,802
1 Claim. (Cl. 313—224)

The invention described herein may be manufactured and used by or for the Government of the United States of America for governmental purposes without the payment of any royalties thereon or therefor.

This invention relates generally to solar radiation simulators and particularly to simulators using high intensity carbon arcs as the source of the simulated energy radiation.

In company with a host of environmental chambers designed to test various types and specimens of equipment to be ultimately used in outer space, it has been found necessary to include tests of such equipment under conditions simulating the effects of sunlight above the earth's atmosphere. While many sources of such simulated energy have been proposed, the high intensity carbon arcs seem most successful.

It has been found that banks of high intensity carbon arcs burning in air can be used to produce a spectral energy distribution which approximates that of the sun outside the earth's atmosphere as established by several well known researchers. Certain major discrepancies have been experienced, however, in the blue and near ultraviolet regions. These discrepancies have been ascertained to consist of strong emission bands due to CN. In order to approximate closely the sun's true spectra, these CN emission bands must be eliminated.

The principal object of this invention, therefore, is to provide an atmosphere for the burning arc which will be devoid of nitrogen and thus prevent the formation of the CN (cyanogen) emission bands.

Another object of this invention is to provide auxiliary apparatus designed to control the arc's atmosphere so that its resultant spectral energy distribution will closely approximate that of the sun in outer space.

Other objects and advantages will appear in the following detailed description and accompanying drawings in which.

Figure 1:
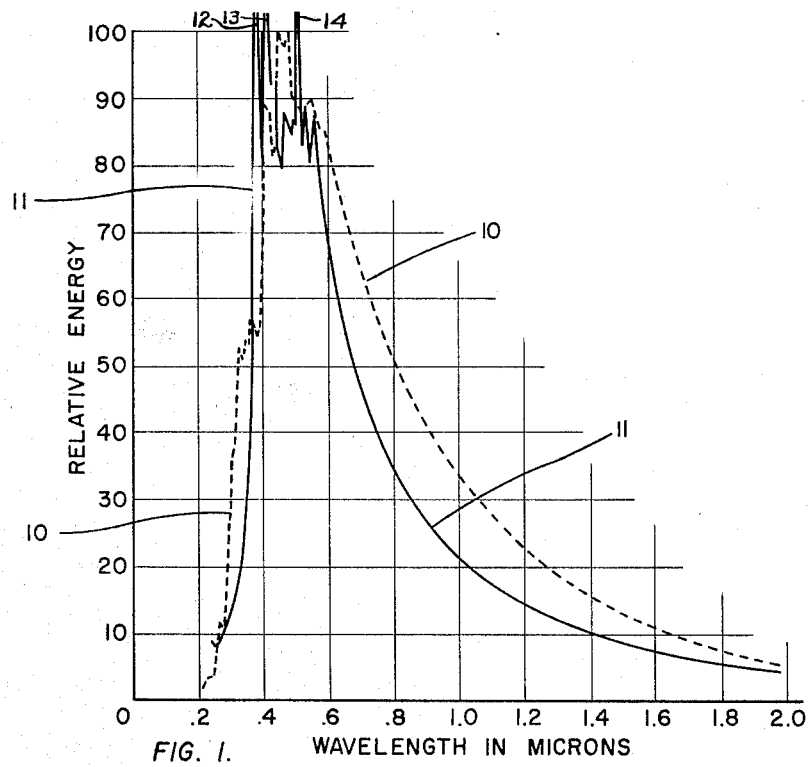
FIGURE 1 is a graph depicting comparative solar energy and arc energy distribution throughout the normal usable spectrum.
Figure 2:
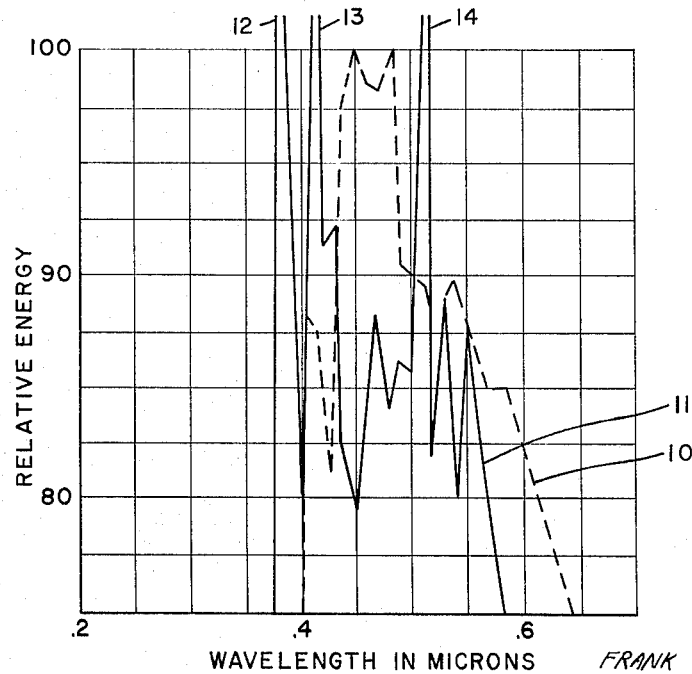
FIG. 2 is an enlargement of the above graph in the area between .35 and .65 micron.

In FIG. 1 and 2, the dotted line 10 indicates the relative intensity of the sun's energy in outer space throughout the normally obscured spectrum. The solid line 11 indicates the energy distribution of the high intensity carbon arc. It will be noted that the CN bands produced by an high intensity arc burning in air are indicated in the black line graph principally at three points marked 12, 13, and 14. These points are left open as shown to indicate that the actual peaks occur considerably above the upper limit of the graph. Actually, these peaks rise from a relative energy value of 300 to 500 compared to the 100 shown on the graph scale. Obviously, such peaked intensities would not only be foreign to the sun's spectra but might have undesirable effects and cause unwanted reactions on and in the material or equipment being tested.

As intimated above, these undesired cyanogen bands can be entirely eliminated by controlling the arc atmosphere, particularly in excluding nitrogen therefrom. This may be readily accomplished by the apparatus schematically diagrammed in FIGS. 3 and 4.

Figure 3:
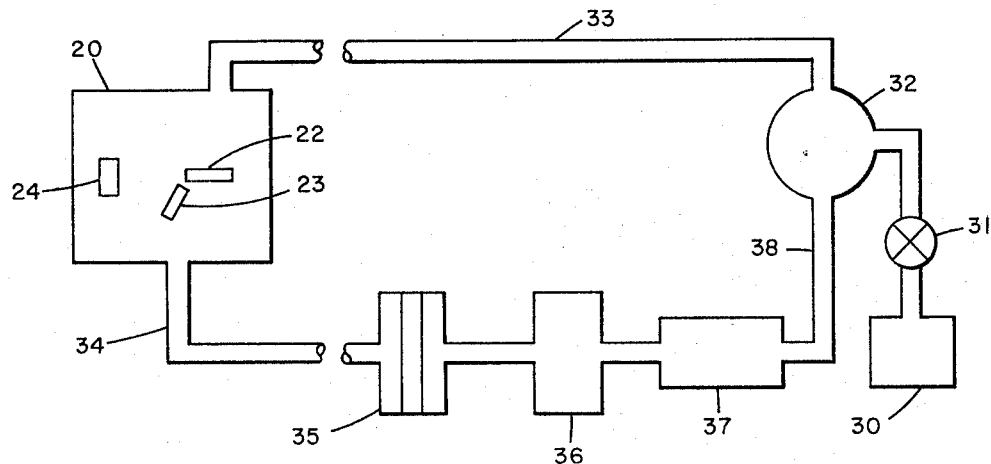
FIG. 3 is a schematic diagram of my improved arc circuit.
Figure 4:
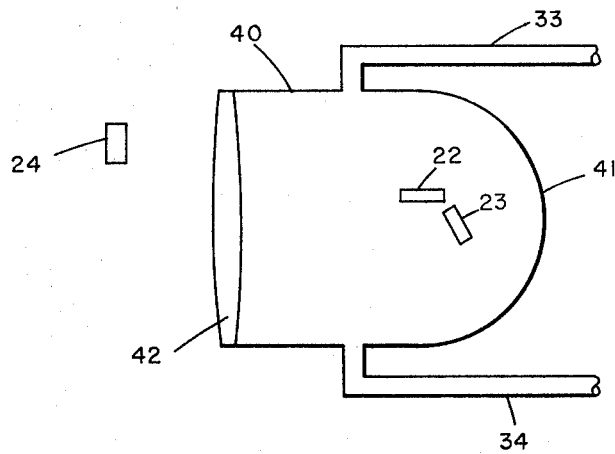
FIG. 4 is partial schematic diagram illustrating another form of arc chamber.

With reference to FIGS. 3 and 4, the arc chamber 20 contains the carbons 22, 23, and the material or equipment sample 24. Since the sample 24 is enclosed with the arc, no special mirrors, lenses, or reflectors are usually required. Such may be supplied if desired. The electrical circuits supplying energy to the arc, being well known, are not indicated or shown. The rest of the circuitry shown indicates piping or conduits conveying a selected gas or vapor from a source of supply or reservoir 30 to the arc chamber 20 and the exhaustion of the products of arc combustion therefrom.

The selected gas or vapor is pumped from reservoir 30 by pump 32. When the system is full of pure gas, valve 31 may be closed and thereafter opened only when additional make-up gas is needed. The gas is then pumped into the arc chamber 20 through conduit or pipe 33. The gas and combustion products are then exhausted through conduit or pipe 34 and pass successively through a dust filter 35, a $CO_2$ absorber 36, a heat exchange 37, and are returned to the inlet side of the pump 32 through conduit or pipe 38. Pressure and temperature measuring instruments (not shown) could be added to the system where needed.

Various gases and mixtures of gases having absorption bands outside of the wavelength range of 0.2 to 2.0 microns would be suitable including hydrogen, helium and a mixture of 20% oxygen and 80% helium Other inert gases, such as argon, would be unsuitable because of the formation of metastable atoms which would interfere with the high current arc mechanism. While hydrogen is usable, its explosive and highly combustible nature would rule against its employment. Because of its good transparency in the UV and IR, helium is the desired gas and will result in a spectrum very closely approaching that of the outer space sun from 0.1 to 10 microns.

If, in the operation of the system, it is found that the presence of carbon particles or dust resulting from the arc combustion is objectionable, a small portion of oxygen, up to 20% of the He-O mixture, may be used to convert the carbon to $CO_2$. Carbon dust or particles would be removed by the filter 35 which may be of an ordinary hot air furnace type and, when oxygen is used, the $CO_2$ would be removed by the $CO_2$ absorber 36 which may be of a soda lime or lithium hydroxide type. Under lengthy periods of operation, heat exchange 37 may be utilized to cool the circulating gas. Air or water cooled heat exchangers could be used if desired. Under normal circumstance, the circulating gas could be used at a pressure of one atmosphere. This pressure could be varied, however, to produce maximum intensity from the arc carbons available for use and the characteristics of the electrical energy supplied thereto.

Under certain circumstances, it may be desirable to expose a sample to the simulated solar radiation externally of the arc chamber. In this event, as shown in FIG. 4, the arc chamber 40 could be provided with hemispherical or, preferably, paraboloidal reflector 41 and a lithium fluoride, aluminum oxide or quartz lens 42, depending upon the transmission characteristics desired. The gas circulating system employed here is substantially similar to that employed in the apparatus shown in FIG. 3.

While having shown and described my invention in connection with the preferred use of helium or a mixture of helium and oxygen as a gaseous medium in which to burn a carbon arc for the purpose of simulating the sun's energy spectrum outside of the earth's atmosphere, it should be understood that the essence of the invention lies in the elimination of nitrogen from the arc's atmosphere and the consequent prevention of the CN emission bands which cause the simulator's spectrum to depart so radically from that of the outer space sun. In other words, the invention is not limited to the preferred gases described but other suitable gases or mixtures thereof may be possibly employed. Having thus described my invention, I claim:

A solar energy simulator having a spectral energy distribution comparable to that of the sun's spectrum outside of the earth's atmosphere comprising an high intensity carbon arc burning in a pressurized gaseous medium consisting of a mixture of twenty percent oxygen and eighty percent helium.

References Cited by the Examiner

UNITED STATES PATENTS

| | | | |
|---|---|---|---|
| 1,835,985 | 12/1931 | Henri | 88—14 |
| 1,851,360 | 3/1932 | Jacobsen | 313—223 |
| 2,390,816 | 12/1945 | Suits | 240—11.2 |
| 2,945,417 | 7/1960 | Caryl et al. | 88—14 |
| 3,001,055 | 9/1961 | Lozier et al. | 219—349 |

OTHER REFERENCES

Thorpe, The Plasma Jet and Its Uses, "Research/Development," January, 1960, pages 5 to 15.

DAVID J. GALVIN, *Primary Examiner.*

JEWEL D. PEDERSON, GEORGE N. WESTBY,
*Examiners.*

T. L. HUDSON, D. E. SRAGOW, *Assistant Examiners.*